United States Patent
Hopkins et al.

(10) Patent No.: US 9,195,681 B2
(45) Date of Patent: Nov. 24, 2015

(54) SYSTEM, METHOD AND COMPUTER PROGRAM PRODUCT FOR TRANSMITTING A GROUP OF DATA ELEMENTS

(75) Inventors: Chris Hopkins, San Mateo, CA (US); Mark Abramowitz, Mill Valley, CA (US); Halloran Parry, San Francisco, CA (US); Blake Markham, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 483 days.

(21) Appl. No.: 13/005,492

(22) Filed: Jan. 12, 2011

(65) Prior Publication Data
US 2011/0247017 A1     Oct. 6, 2011

Related U.S. Application Data

(60) Provisional application No. 61/320,184, filed on Apr. 1, 2010.

(51) Int. Cl.
*G06F 15/16* (2006.01)
*G06F 17/30* (2006.01)

(52) U.S. Cl.
CPC .... *G06F 17/30283* (2013.01); *G06F 2209/547* (2013.01)

(58) Field of Classification Search
CPC ............. G06F 17/30283; G06F 2209/547; G06F 3/00; G06F 7/00; G06F 7/02
USPC ................. 709/206, 220, 221, 222
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,006,234 A * | 12/1999 | Govindarajan et al. ............... 1/1 | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |

(Continued)

OTHER PUBLICATIONS

U.S. Appl. No. 60/828,192, filed Oct. 4, 2006.
U.S. Appl. No. 12/949,723, filed Nov. 18, 2010.
Microsoft Corporation, Exchange Server Protocol Documents, retrieved from http://msdn.microsoft.com/en-us/library/cc425499%28v=EXCHG.80%29.aspx on Jan. 11, 2011 (16 pages).

*Primary Examiner* — Phuoc Nguyen
*Assistant Examiner* — Davoud Zand
(74) *Attorney, Agent, or Firm* — Zilka-Kotab, PC

(57) ABSTRACT

In accordance with embodiments, there are provided mechanisms and methods for transmitting a group of data elements. These mechanisms and methods for grouping a plurality of data elements can enable more efficient data transmission, improved synchronization and data management, etc.

14 Claims, 7 Drawing Sheets

(56) References Cited

U.S. PATENT DOCUMENTS

| | | |
|---|---|---|
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,842,892 B1 * | 1/2005 | Goldberg et al. ............ 717/108 |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,209,929 B2 | 4/2007 | Dominguez, Jr. et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,779,039 B2 | 8/2010 | Weissman et al. |
| 8,015,495 B2 | 9/2011 | Achacoso et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 8,280,913 B2 * | 10/2012 | Bergin .................... 707/793 |
| 8,457,545 B2 | 6/2013 | Chan |
| 8,484,111 B2 | 7/2013 | Frankland et al. |
| 8,862,735 B1 * | 10/2014 | Singh et al. ............... 709/226 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2003/0233404 A1 | 12/2003 | Hopkins |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0123285 A1 * | 6/2004 | Berg et al. ................ 717/174 |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0065925 A1 | 3/2005 | Weissman et al. |
| 2005/0091098 A1 | 4/2005 | Brodersen et al. |
| 2005/0223022 A1 | 10/2005 | Weissman et al. |
| 2005/0273497 A1 * | 12/2005 | Patrick et al. .............. 709/206 |
| 2005/0283478 A1 | 12/2005 | Choi et al. |
| 2006/0004856 A1 * | 1/2006 | Shen et al. ............... 707/103 Y |
| 2006/0021019 A1 | 1/2006 | Hinton et al. |
| 2006/0031353 A1 * | 2/2006 | Patrick et al. .............. 709/206 |
| 2006/0031354 A1 * | 2/2006 | Patrick et al. .............. 709/206 |
| 2006/0031355 A1 * | 2/2006 | Patrick et al. .............. 709/206 |
| 2006/0031431 A1 * | 2/2006 | Patrick et al. .............. 709/220 |
| 2006/0031432 A1 * | 2/2006 | Patrick et al. .............. 709/220 |
| 2006/0031433 A1 * | 2/2006 | Patrick et al. .............. 709/220 |
| 2006/0080419 A1 * | 4/2006 | Patrick et al. .............. 709/220 |
| 2006/0206834 A1 | 9/2006 | Fisher et al. |
| 2008/0249972 A1 | 10/2008 | Dillon |
| 2009/0044183 A1 * | 2/2009 | Quin et al. ................ 717/169 |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2010/0179940 A1 * | 7/2010 | Gilder et al. .............. 707/622 |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2013/0173539 A1 * | 7/2013 | Gilder et al. .............. 707/622 |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0040182 A1 * | 2/2014 | Gilder et al. .............. 707/602 |
| 2014/0359537 A1 | 12/2014 | Jackobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |

* cited by examiner

SYSTEM, METHOD AND COMPUTER PROGRAM PRODUCT FOR TRANSMITTING A GROUP OF DATA ELEMENTS

CLAIM OF PRIORITY

This application claims the benefit of U.S. Provisional Patent Application 61/320,184, entitled "Sync API," by Hopkins et al., filed Apr. 1, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to data transmission, and more particularly to grouping data elements for transmission.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Data transmission is a common practice of conventional systems. For example, data may be sent between a first system and a second system in order to synchronize the systems. Unfortunately, conventional data transmission techniques have been associated with various limitations.

Just by way of example, traditional methods of synchronizing a calendar meeting between systems may require multiple calls back and forth between the systems, where each call deals with a portion of the meeting (e.g., meeting time, recurrence pattern, attendees, etc.). Additionally, if any errors are encountered during the synchronization, it may be difficult to determine where the error took place and all calls involved with the event may have to be rolled back. Accordingly, it is desirable to provide techniques that improve data transmission between systems.

BRIEF SUMMARY

In accordance with embodiments, there are provided mechanisms and methods for transmitting a group of data elements. These mechanisms and methods for transmitting a group of data elements can enable more efficient data transmission, improved synchronization and data management, etc.

In an embodiment and by way of example, a method for transmitting a group of data elements is provided. In one embodiment, a plurality of data elements is identified. Additionally, the plurality of data elements is grouped. Further, the group of data elements is transmitted, utilizing an application programming interface (API).

While one or more implementations and techniques are described with reference to an embodiment in which transmitting a group of data elements is implemented in a system having an application server providing a front end for an on-demand database system capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for transmitting a group of data elements.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers.

Next, mechanisms and methods for transmitting a group of data elements will be described with reference to example embodiments.

Figure 1:
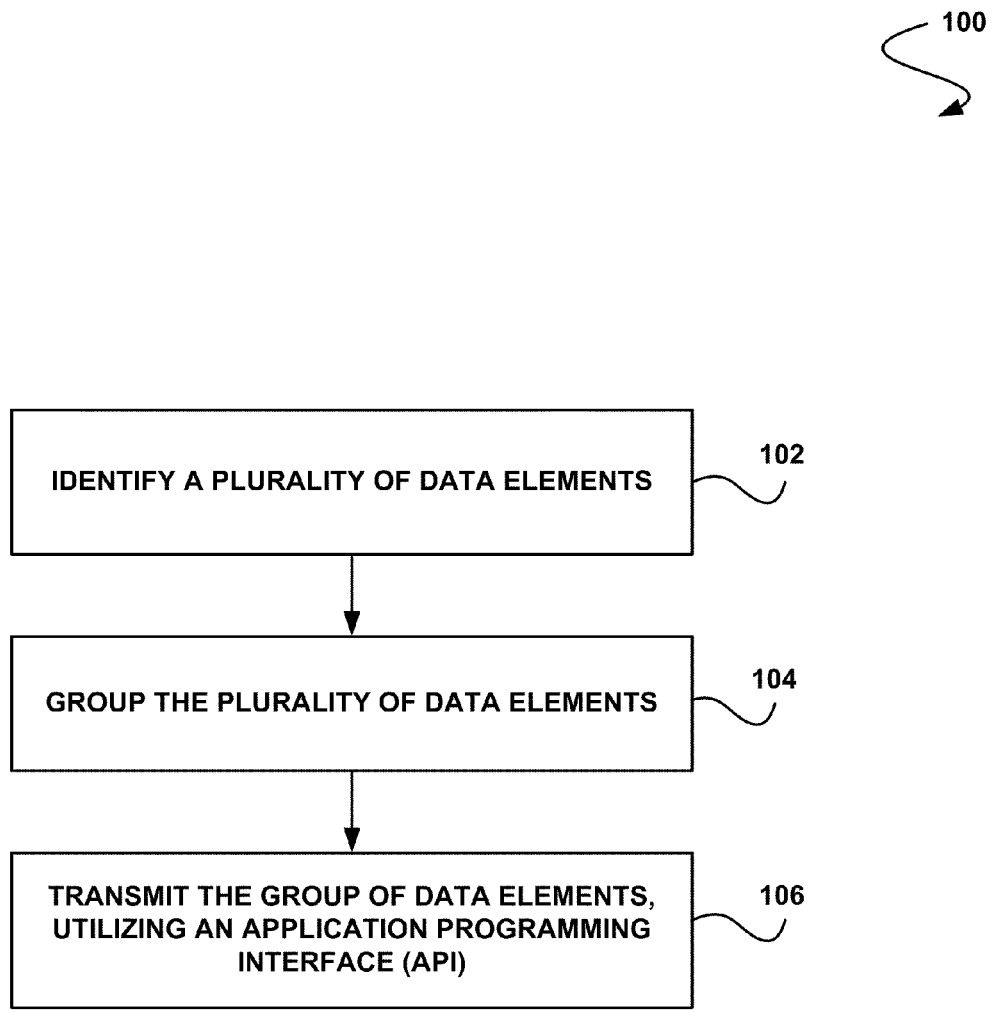
FIG. 1 illustrates a method for transmitting a group of data elements, in accordance with one embodiment.

FIG. 1 illustrates a method 100 for transmitting a group of data elements, in accordance with one embodiment. As shown in operation 102, a plurality of data elements is identified. In one embodiment, the plurality of data elements may include one or more objects. For example, the plurality of data elements may include one or more entities such as an individual (e.g., a contact, etc.), a company, etc. In another example, the plurality of data elements may include a location, such as an address, a room number, etc. In yet another embodiment, the one or more objects may include one or more identifiers. For example, an object representing an individual may include a name, a phone number, an electronic mail message address, etc. In still another example, the plurality of data elements may include one or more criteria (e.g., criteria to be used in a search, etc.).

Additionally, in one embodiment, the plurality of data elements may include one or more interrelationships between the objects. For example, the plurality of data elements may include an organizational structure of a plurality of objects (e.g., a nesting of objects, etc.). In another example, the plurality of data elements may include a description of one or more objects. For example, the plurality of data elements may include an indication that one or more of the objects are attendees of a meeting, an indication that the meeting is to be held at a particular location, etc. In another embodiment, the plurality of data elements may include one or more instances of metadata.

Further, in yet another embodiment, the plurality of data elements may include one or more actions to be performed. For example, the plurality of data elements may include one or more actions to be performed at a system (e.g., a computer, a server, a client, a multi-tenant on-demand database system, a database, etc.) that receives the data elements. In another example, the plurality of data elements may include one or more instructions to perform one or more of inserting an object, updating an object, deleting an object, matching an object, requesting an object, etc.

Further still, in another embodiment, the plurality of data elements may be associated with an event. For example, the plurality of data elements may be associated with a meeting, an opportunity (e.g., a deal, etc.), etc. Also, in one embodiment, the plurality of data elements may be associated with a record. In yet another embodiment, the plurality of data elements may be dependent upon each other. For example, the plurality of data elements may include one or more of objects, interrelationships between those objects, actions to be performed on those objects, etc.

In still another embodiment, the plurality of data elements may include data that is to be replicated between two systems. For example, the plurality of data elements may be sent from one system to be replicated at another system. In another example, the plurality of data elements may be utilized by applications at each of the systems (e.g., personal information manager software, electronic mail message software, scheduling software, etc.). Further, in another embodiment, the plurality of data elements may be identified at one of the systems (e.g., at a client, at a multi-tenant on-demand database system, etc.)

Additionally, it should be noted that, as described above, such multi-tenant on-demand database system may include any service that relies on a database system that is accessible over a network, in which various elements of hardware and software of the database system may be shared by one or more customers (e.g. tenants). For instance, a given application server may simultaneously process requests for a great number of customers, and a given database table may store rows for a potentially much greater number of customers. Various examples of such a multi-tenant on-demand database system will be set forth in the context of different embodiments that will be described during reference to subsequent figures.

Furthermore, as shown in operation 104, the plurality of data elements is grouped. In one embodiment, the plurality of data elements may be grouped as a single data structure. For example, the plurality of data elements may be bundled, combined, etc. within a single object, a single request item, a single application programming interface (API) package, etc.

Also, as shown in operation 106, the group of data elements is transmitted, utilizing an application programming interface (API). In one embodiment, the group of data elements may be transmitted using a single transaction. For example, the group of data elements may be transmitted using a single API call. In another embodiment, the group may be transmitted from one system to another system. For example, the group of data elements may be transmitted from a client computer to a multi-tenant on-demand database system, from a multi-tenant on-demand database system to a client computer, etc.

Additionally, in one embodiment, one or more operations may be performed at a recipient of the group of data elements. For example, one or more actions included within the group of data elements may be performed at the recipient of the group of data elements (e.g., at a system that received the group of data elements, etc.). More specifically, in another example, based on the plurality of data elements, one or more of the plurality of data elements may be inserted at the recipient, updated at the recipient, deleted at the recipient, etc. In yet another example, a search may be performed for one or more of the plurality of data elements at the recipient.

Further, in another embodiment, the recipient of the group of data elements may send a response to the sender of the plurality of data elements. For example, the recipient may send the results of performing the one or more operations at the recipient to the sender. In another embodiment, the response may include a plurality of additional data elements which are grouped and transmitted via a single transaction utilizing the API.

In this way, the plurality of data elements may be sent in a single bulk operation to a recipient. Additionally, interdependencies between the data elements may be sent through one bulk call instead of through multiple separate API calls. Further, the replication of data elements between systems may be performed in a single call without having multiple calls between the systems.

Figure 2:
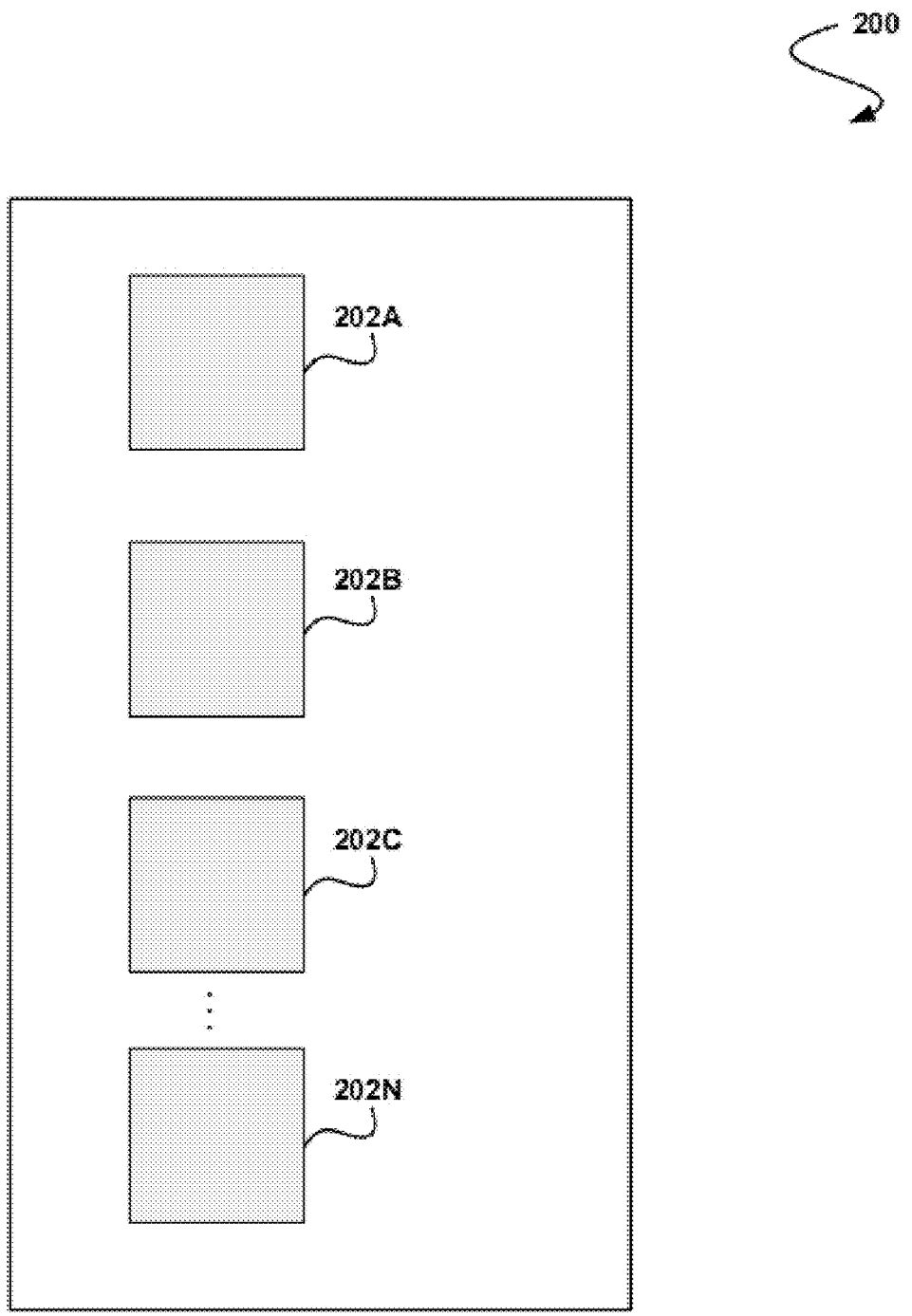
FIG. 2 illustrates an exemplary data element grouping, in accordance with another embodiment.

FIG. 2 illustrates an exemplary data element grouping 200, in accordance with another embodiment. As an option, the present grouping 200 may be carried out in the context of the functionality of FIG. 1. Of course, however, the grouping 200 may be carried out in any desired environment. The aforementioned definitions may apply during the present description.

As shown, the exemplary data element grouping 200 includes a plurality of commands 202A-N. In one embodiment, the commands 202A-N may be associated with one or more entities. For example, the commands 202A-N may be associated with one or more contacts. In another embodiment, the commands 202A-N may each be associated with an action that is to be performed. For example, each of the commands 202A-N may instruct the recipient of the data element grouping 200 to insert an entity into its records, update an entity already in its records, delete an entity from its records, search for an entity meeting predefined criteria (via one or more queries, etc.), etc.

In another embodiment, each of the commands 202A-N may be contained with the data associated with the command. For example, the command may include a command to insert a contact into a system, and the contact may be contained with the insert commend within the data element grouping 200. Additionally, in one embodiment, the exemplary data element grouping 200 may comprise an object. For example, the exemplary data element grouping 200 may comprise a standard API data structure (e.g., a SObject, etc.), and the commands 202A-N may be encapsulated within the data structure.

In another embodiment, one or more data elements in the data element grouping 200 may be placed in a queue. For example, an API may receive the data element grouping 200 and may put one or more of the commands 202A-N into an unresolved items queue. Additionally, see, for example, U.S. patent application Ser. No. 12/949,723, filed Nov. 18, 2010, which is hereby incorporated by reference in its entirety, and which describes exemplary association queues.

In this way, multiple commands 202A-N may be sent as a batch to a system in one API call via the data element grouping 200, thereby avoiding multiple transactional calls.

Figure 3:
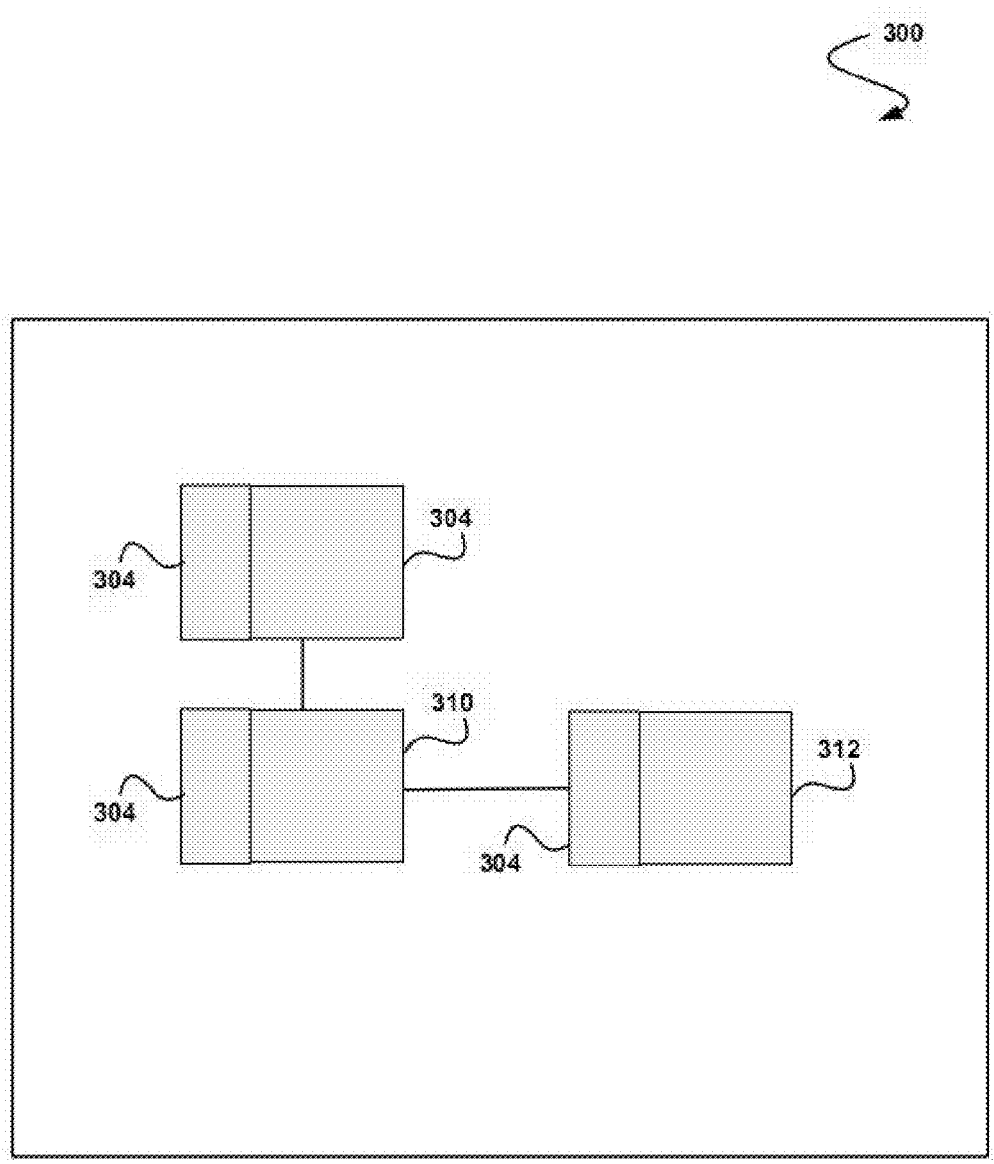
FIG. 3 illustrates an exemplary event grouping, in accordance with yet another embodiment.

FIG. 3 illustrates an exemplary event grouping 300, in accordance with another embodiment. As an option, the present grouping 300 may be carried out in the context of the functionality of FIGS. 1-2. Of course, however, the grouping 300 may be carried out in any desired environment. The aforementioned definitions may apply during the present description.

As shown, the event grouping 300 includes event information 302. In one embodiment, the event information 302 may include any information about the event, including a time of the event, a location of the event, etc. Associated with the event information 302 is a command 304. In one embodiment, the command 304 may instruct a recipient system to insert the associated event information 302, update the associated event information 302, remove the associated event information 302, etc.

Additionally, the event grouping 300 includes data 306 and 308 describing associated individuals and associated commands 310 and 312. In one embodiment, the data 306 and 308 may describe individuals associated with the event (e.g., participants in the event, individuals who cannot make the event, etc.). In another embodiment, the may include an email address of each individual, a first and/or last name of each individual, etc. Additionally, in yet another embodiment, commands 310 and 312 may include commands to be performed on associated data 306 and 308 describing associated individuals, respectively.

Further, in one embodiment, the system receiving the event grouping 300 may perform matching within the system based on the data 306 and 308 describing the associated individuals. For example, the system may first insert the event information 302 if the command 304 is an insert command, and may then match the data 306 and 308 describing associated individuals against data already in the system (e.g., in one or more databases, etc.). Additionally, the system may then resolve any multiple matches between system data and the data 306 and 308 and may perform commands 310 and 312 based on the match results.

In this way, all data associated with an event may be input to the system in one call utilizing the event grouping 300, and may therefore avoid any cross call transactions. Additionally, fault tolerance may be improved. For example, if the event is created at the server using event information 302 and command 304, but an error occurs (e.g., due to a system error, database crash, etc.) before data 306 and 308 describing associated individuals is inserted into the system, all data associated with the event grouping 300 may be rolled back, thereby avoiding confusion as to where to manually roll back and recover. Additionally, a system that sent the event grouping 300 may then simply resend the event grouping 300 to retry synchronizing the event with the receiving system.

Figure 4:
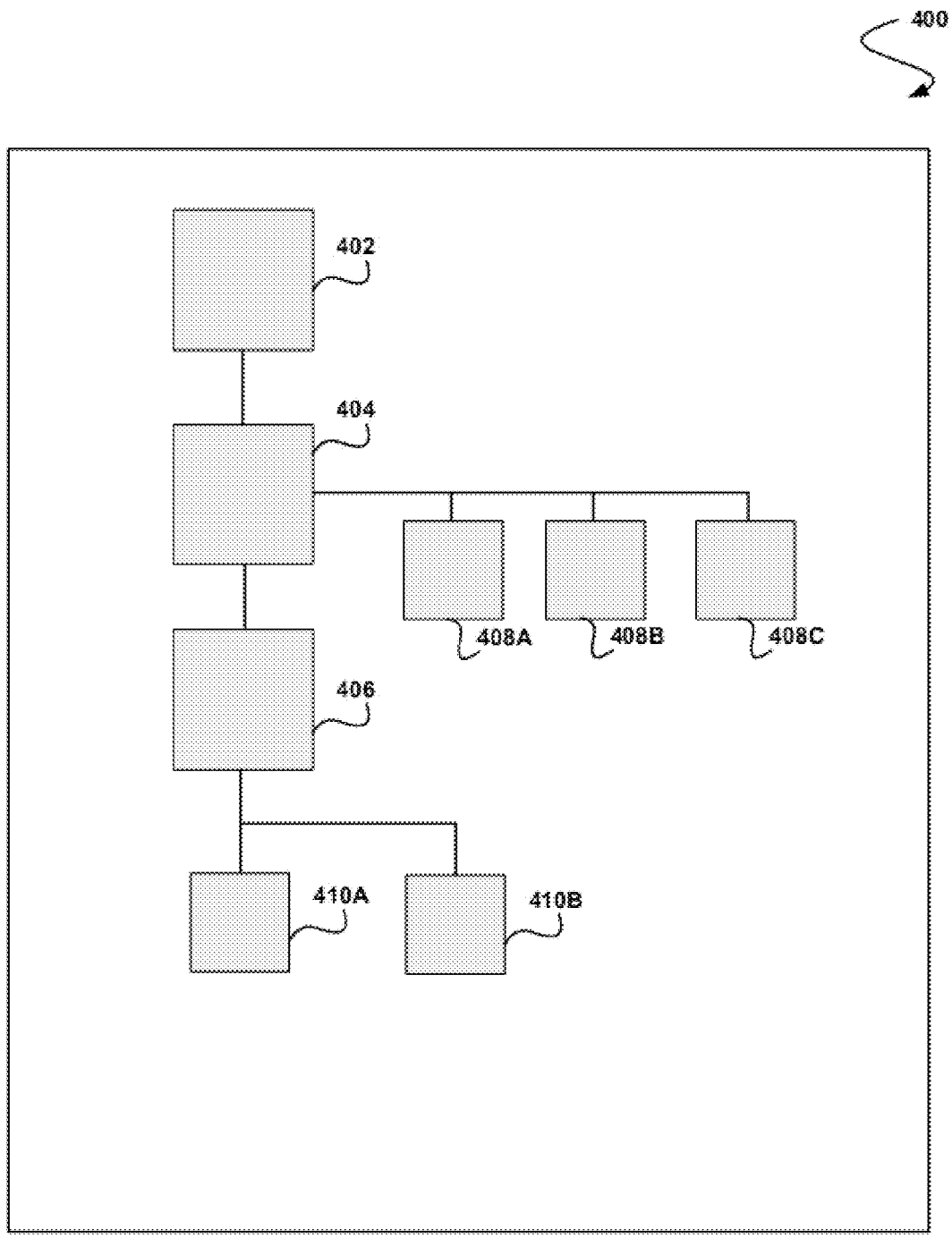
FIG. 4 illustrates an exemplary custom object grouping, in accordance with still another embodiment.

FIG. 4 illustrates an exemplary custom object grouping 400, in accordance with another embodiment. As an option, the present grouping 400 may be carried out in the context of the functionality of FIGS. 1-3. Of course, however, the grouping 400 may be carried out in any desired environment. The aforementioned definitions may apply during the present description.

As shown, the custom object grouping 400 includes custom objects 402, 404, and 406. In one embodiment, each of the custom objects 402, 404, and 406 may be distinct from each other. Additionally, the custom object grouping 400 includes objects 408A-C are associated with custom object 404, as well as objects 410A and 410B, which are associated with custom object 406. In one embodiment, objects 408A-C may be nested within custom object 404, and objects 410A and 410B may be nested within custom object 406. In this way, a single API call for custom object grouping 400 may transmit all custom objects 402, 404, and 406 to a destination system.

Additionally, in one embodiment, the custom object grouping 400 may include a single event model. For example, the single event model may be broken up into two basic concepts with respect to a replication client. The first important idea is for the system platform to allow what is known as a "nested update," or "hierarchical update," to an event. For instance, DML operations pushed via the API may be allowed to send chunks of modifications in one request item. This request item may contain different object types, (e.g., attendee state changes in addition to event body changes, etc.). Additionally, this idea may be extended further, and may allow for a client to create a pattern and apply any exception or deleted instance state in one request. In another embodiment, this entire chunk of work can be run in a single transaction (e.g., an oracle transaction, etc.), and may allow for a graceful client side error recovery.

Further, in one embodiment, a new system on-demand programming language (e.g., APEX, etc.) package may be created that defines a single new entry point into the system, (e.g., called "command," etc.). In another embodiment, the command entry point may takes a collection of APEX objects that are defined and that represent different types of data operations (e.g., createCommand, updateCommand, deleteCommand, retrieveCommand, etc.). Table 1 illustrates examples of general forms of command objects. Of course, it should be noted that the command objects shown in Table 1 are set forth for illustrative purposes only, and thus should not be construed as limiting in any manner.

TABLE 1

SObject standard sobject as defined by WSDL's
AssociationControl used for create commands that involve serverside matching (sfoMatch)
may be setup per sfdc profile on the platform, default rules per entity per profile
ChildRelationShipControl may define a relationship to use to the parent object, can be defaulted to an existing master detail relationship if none is specified TABLE 1-continued every nested command element may contain exactly one or null
top level commands may be null
may be used to re-parent an existing child record in an update command
commands recursive definition for controlling detail or child object state
command objects included here may be run in the context for the direct
parent (e.g., master-detail, etc.)
sequence of commands may be deterministic, (e.g., they may be run in the
order they appear, etc.)
child commands that have children themselves may be run to the bottom
of the stack before the next command at the same level is processed
(pattern exception update -> apply attendee state changes)
each top level command may be considered its own unit of work and may
run in its own transaction
the first fatal error encountered in a command stack may roll back the
commands transaction and that error is returned
any workflow or APEX trigger actions that fire may also run in the
command items transaction or workflow and triggers may be disabled
for the command stack
*special* pattern instances may be modified by originaldatetime for update and
delete (no concept of create)
creating attendees may be done through a nested createCommand with the
appropriate AssociationControl options specified Additionally, in one embodiment, each command item may return a CommandResponse object. Table 2 illustrates examples of general forms of CommandResponse objects. Of course, it should be noted that the CommandResponse objects shown in Table 2 are set forth for illustrative purposes only, and thus should not be construed as limiting in any manner.

TABLE 2

ErrorCode - standard notion
ErrorDescription - standard
AssociationQueue response - did a create result in an association queue work item
commandResponses - collection of responses gathered from child command items.
These may directly mirror the command items passed up to the new verb In another embodiment, a pattern may be created in the system with the command API. In one embodiment, the client application may determine that a pattern should be pushed to the system. Additionally, the client may construct a new createCommand object that represents the pattern master. The sobject value may be a standard system partner WSDL event object. Further, the client may add Outlook attendees directly to the pattern master createCommand item collection using only the information available in Outlook, which may include the name, response status and email address.

Further still, in another embodiment, this attendee state may be wrapped in a createCommand item, which may contain the relationship information to the pattern and any associationQ settings desired. Also, a hosted configuration system for how attendees are resolved, how failed to resolve attendees are treated, etc. may be provided. In addition, the client may then add any instance exceptions to the pattern master createCommand by creating updateCommand items that correspond to all the pattern exceptions that exist on the client. Since updates to instances identified by the instance original datetime may be allowed, this may succeed (in the given context the pattern id from the top level is known).

Furthermore, in yet another embodiment, deleted instances of the client pattern may be handled in a similar way to updates. For example, the instance may be identified by only the original datetime of the instance, though the client may be allowed to provide the actual system id if it is known (though this may not be required).

Further still, in one embodiment, a file based APEX API may be created that may allows a system outlook sync client to match events and contacts in Outlook to records in the system. A user's calendar in Outlook may match their system calendar. Syncing may be bi-directional. Additionally, in another embodiment, the API internal namespace may be "syncapi" and all APEX files may be stored in "/apex/syncapi/<version>/." Further, this API may be meant to be consumed by the system outlook client only. Because the client is external, the API may be accessed by anyone who knows the endpoint URL, but these endpoints may not be published, and the API may not be documented externally. Additionally, a client id may be required as part of every API call.

Also, in another embodiment, web service definition language (WSDL) generation may be automatically done by the ApexClassWsdlGenerator class. Additionally, in order to include the right definitions, a hook may be added to the ApexClassWsdlGenerator which may determine which object definitions to use, and a new SyncApiWsdlGenerator may set the hooks correctly. Further, the separate wsdl generator class may requires a separate extension of ApexClassWsdlServlet, called SyncApiWsdlServlet, which in turn may demands a new entry in resin.conf: "<servlet-mapping url-pattern='/services/wsdl/class/syncapi/*' servlet-class='common.apex.soap.servlet.SyncApi WsdlServlet'/>."

In another embodiment, a sync API may include a collection of file based APEX classes that may allows a client to do the following: 1. Find recurring events in the system that match a set of criteria passed up by the client via the match( ) call; 2. Perform create, update, and delete operations on recurring events and their occurrences via the command( ) call. It may include one piece of the solution to the problem of "How do I keep my Outlook and system calendars in sync with each other?" Additionally, in one embodiment, the sync API may handle recurring events.

Table 3 illustrates an exemplary transaction flow between a client and the sync API. Of course, it should be noted that the transaction flow shown in Table 3 are set forth for illustrative purposes only, and thus should not be construed as limiting in any manner.

TABLE 3

| Client | Sync API |
|---|---|
| match(BaseCommand[ ]) ---------------------------------------------> | |
| | MatchCommandResult[ ] <--------------------------------------------- |
| command(BaseCommand[ ]) ---------------------------------------------> | |
| | CommandDMLResult[ ] <--------------------------------------------- |

In one embodiment, the match( ) function may be designed to match non-system events in Outlook with corresponding events in the system. Additionally, it may be used to enable the client to add system event IDs to Outlook events. In another embodiment, match( ) may query for recurring event pattern masters, and for events the user owns.

Further, in another embodiment, the command( ) function may be the mechanism by which the client can create event data in the system. In yet another embodiment, the command( ) function may use a silo data structure. Within a given silo, the top level command may describe an operation on the pattern master, and the detail commands may be used for operations on instances of the parent pattern. Also, in one embodiment, match( ) may only be called on pattern masters, and pattern instances may be matched in order to process detail commands. This may be done using the OriginalInstanceDate column on core.activity. In another embodiment, detail commands may include a value for OriginalInstanceDate so that the corresponding pattern occurrence may be found in the system. Further still, in one embodiment, the following CRUD operations may be supported: Pattern Master—CREATE, UPDATE, DELETE; Pattern Instance—UPDATE, DELETE.

In one embodiment, the sync API may implement its own FLS and CRUD checks (e.g., because APEX may not perform these checks itself, etc.). In another embodiment, FLS may be checked on all calls to the Sync API, on all fields that are being read or updated. Additionally, if the who and/or what fields are populated on an even row, a CRUD check may be performed on these fields before any create, update, or delete of an event row. In yet another embodiment, OriginalInstanceDate may not be passed up on recurrence objects and may be passed up on occurrences. Additionally, IsException may not be passed up. It may not be evaluated on a match call, and may not be an updaeable field. Further, recurrence pattern fields (e.g., recurrenceType, etc.) may only be passed up on recurrence objects. They may be used for match and to create and update rows if they are sent up.

Also, in one embodiment, 3 levels of error handling may be performed. For example, error handing may include responding to failing a single second level command, a silo, or the whole transaction (all silos). In the case of a single command failure, a second level command may be failed if the original instance cannot be found. This may happen due to activity history tracking. In another embodiment, if a silo fails, all operations on both the pattern master and any occurrences already operated on may be rolled back. For example, this may be done using save points. In another embodiment, a silo may also fail if there is a fatal programmer error (e.g., fields not populated or populated incorrectly) or if every operation in the silo cannot be completed for any reason except for failure to find an occurrence. Possible reasons for failing a silo include FLS restrictions, lack of CRUD on a who or what, or other errors. In another embodiment, partial updates to silos may not be supported (e.g., either the whole thing works or the whole thing fails, etc.).

In still another embodiment, a whole transaction (all silos) may fail if there is a condition which a) can be detected early and b) prevents completion of any transactions. In this case, rather than return a CommandDMLResult array, an exception may be thrown that may bubble up to the client. Possible causes may include: lack of the Edit Event permission, database failure, too many silos passed into one of the endpoints, invalid clientId, etc.

Additionally, in one embodiment, in order to support group events (GEs) and group recurring events (GREs), a BaseCommand data structure may need to be updated to accommodate attendees. For example, the client may need to be able to match attendees in outlook to contacts and leads in the system.

Once the attendees are matched, the client may need to be able to perform CUD operations on EventAttendee rows. Table 4 illustrates an exemplary BaseCommand data structure update. Of course, it should be noted that the update shown in Table 4 is set forth for illustrative purposes only, and thus should not be construed as limiting in any manner.

TABLE 4

```
BaseCommand {
    web service CommandTypeEnum commandType;
```

TABLE 4-continued

```
    web service SObject primarySObject;
    web service BaseCommand[ ] detailCommands;
    web service String[ ] fieldsToNull;
    web service String clientGuid;
    //New members to support attendees
    web service AttendeeObject attendee;
    web service BaseCommand[ ] attendeeCommands;
}
```

Figure 5:
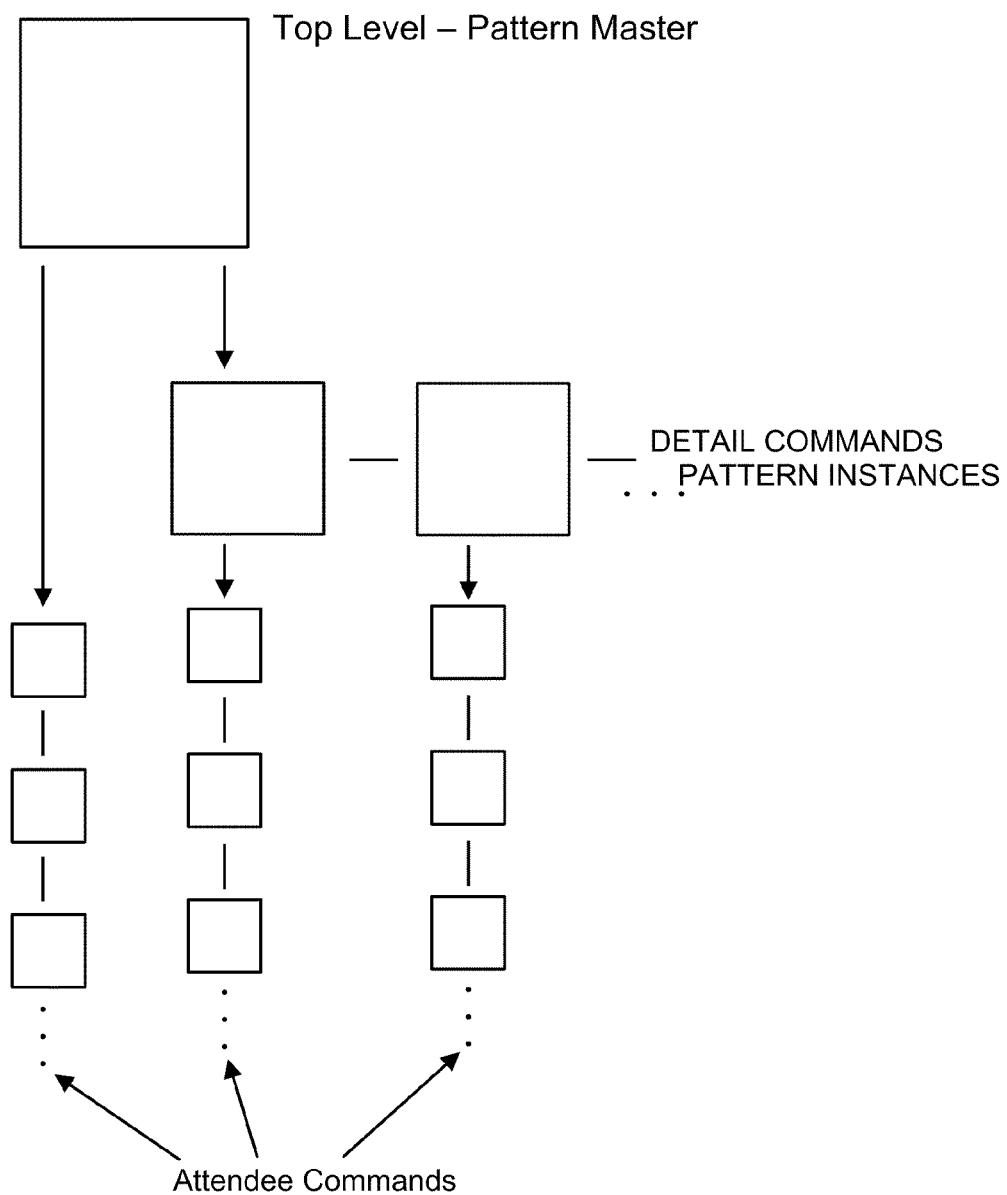
FIG. 5 illustrates a technique for adding support for attendee DML operations in a command structure, in accordance with another embodiment.

FIG. 5 illustrates a technique for adding support for attendee DML operations in a command structure. Additionally, the valid states for a BaseCommand object may be illustrated. Table 5 illustrates an exemplary top level command object. Of course, it should be noted that the object shown in Table 5 is set forth for illustrative purposes only, and thus should not be construed as limiting in any manner. Additionally, in one embodiment, the top level command may represent a single event, a group event, a recurring event series, a GRE, etc.

TABLE 5

Single Event

Required Fields:
   commandType
   primarySObject
Optional Fields:
   fieldsToNull
   clientGuid
May be Null:
   detailCommands
   attendee
   attendeeCommands Group Event Required Fields:
   commandType
   primarySObject
   attendeeCommands
Optional Fields:
   fieldsToNull
   clientGuid
May be Null:
   detailCommands
   attendee Recurring Event Required Fields:
   commandType
   primarySObject
Optional Fields:
   fieldsToNull
   clientGuid
   detailCommands
May be Null:
   attendee
   attendeeCommands Further, in one embodiment, the primarySObject on a top level Recurring Event Command object may be the pattern master. Table 6 illustrates an exemplary group recurring event object. Of course, it should be noted that the object shown in Table 6 is set forth for illustrative purposes only, and thus should not be construed as limiting in any manner.

TABLE 6

Group Recurring Event

Required Fields:
   commandType
   primarySObject

TABLE 6-continued

Group Recurring Event attendeeCommands
Optional Fields:
    fieldsToNull
    clientGuid
    detailCommands
May be Null:
    attendee Further still, in another embodiment, a detail command may represent an operation on an occurrence of a pattern. If the occurrence has attendees, those may be represented in the attendeeCommands list. A detail command must be parented by a top level command. A detail command may not contain detail commands. Table 7 illustrates an exemplary detail command object. Of course, it should be noted that the object shown in Table 7 is set forth for illustrative purposes only, and thus should not be construed as limiting in any manner.

TABLE 7

Required Fields:
    commandType
    primarySObject
Optional Fields:
    fieldsToNull
    clientGuid
    attendeeCommands
May be Null:
    detailCommands
    attendee Also, in yet another embodiment, an attendee command may represent an operation on an AttendeeObject. An attendee command may be parented by either a top level or a detail command. A detail command may not contain detail commands. Table 8 illustrates an exemplary attendee command object. Of course, it should be noted that the object shown in Table 8 is set forth for illustrative purposes only, and thus should not be construed as limiting in any manner.

TABLE 8

Figure 6:
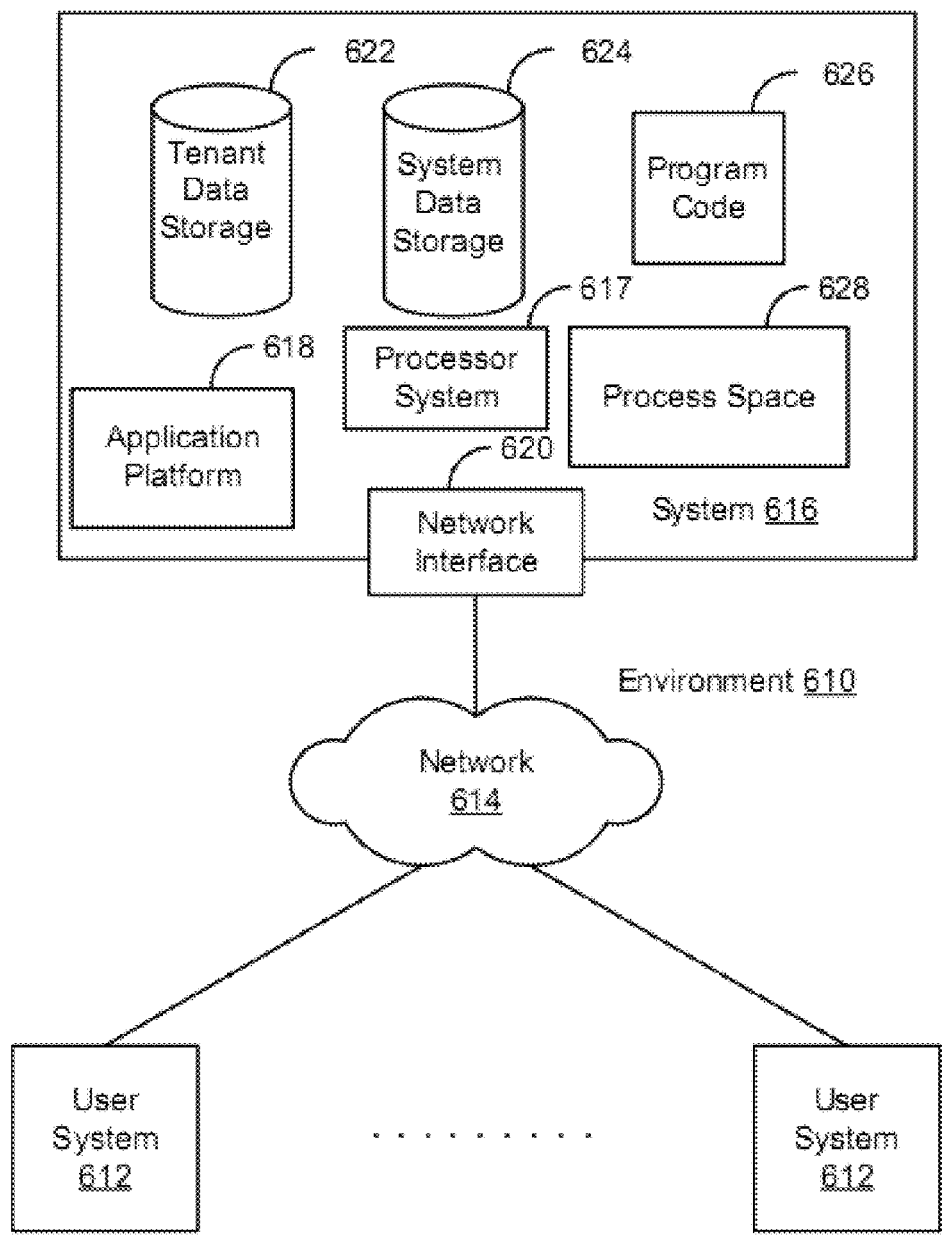
FIG. 6 illustrates a block diagram of an example of an environment wherein an on-demand database system might be used.

Required Fields:
    commandType
    attendee
Optional Fields:
    clientGuid
May be Null:
    detailCommands
    primarySObject
    fieldsToNull
    attendeeCommands System Overview FIG. 6 illustrates a block diagram of an environment 610 wherein an on-demand database system might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database system exists. User system 612 may be any machine or system that is used by a user to access a database user system. For example, any of user systems 612 can be a handheld computing device, a mobile phone, a laptop computer, a work station, and/or a network of computing devices. As illustrated in FIG. 6 (and in more detail in FIG. 7) user systems 612 might interact via a network 614 with an on-demand database system, which is system 616.

An on-demand database system, such as system 616, is a database system that is made available to outside users that do not need to necessarily be concerned with building and/or maintaining the database system, but instead may be available for their use when the users need the database system (e.g., on the demand of the users). Some on-demand database systems may store information from one or more tenants stored into tables of a common database image to form a multi-tenant database system (MTS). Accordingly, "on-demand database system 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database system 616 may include an application platform 618 that enables creation, managing and executing one or more applications developed by the provider of the on-demand database system, users accessing the on-demand database system via user systems 612, or third party application developers accessing the on-demand database system via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Pentium® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7:
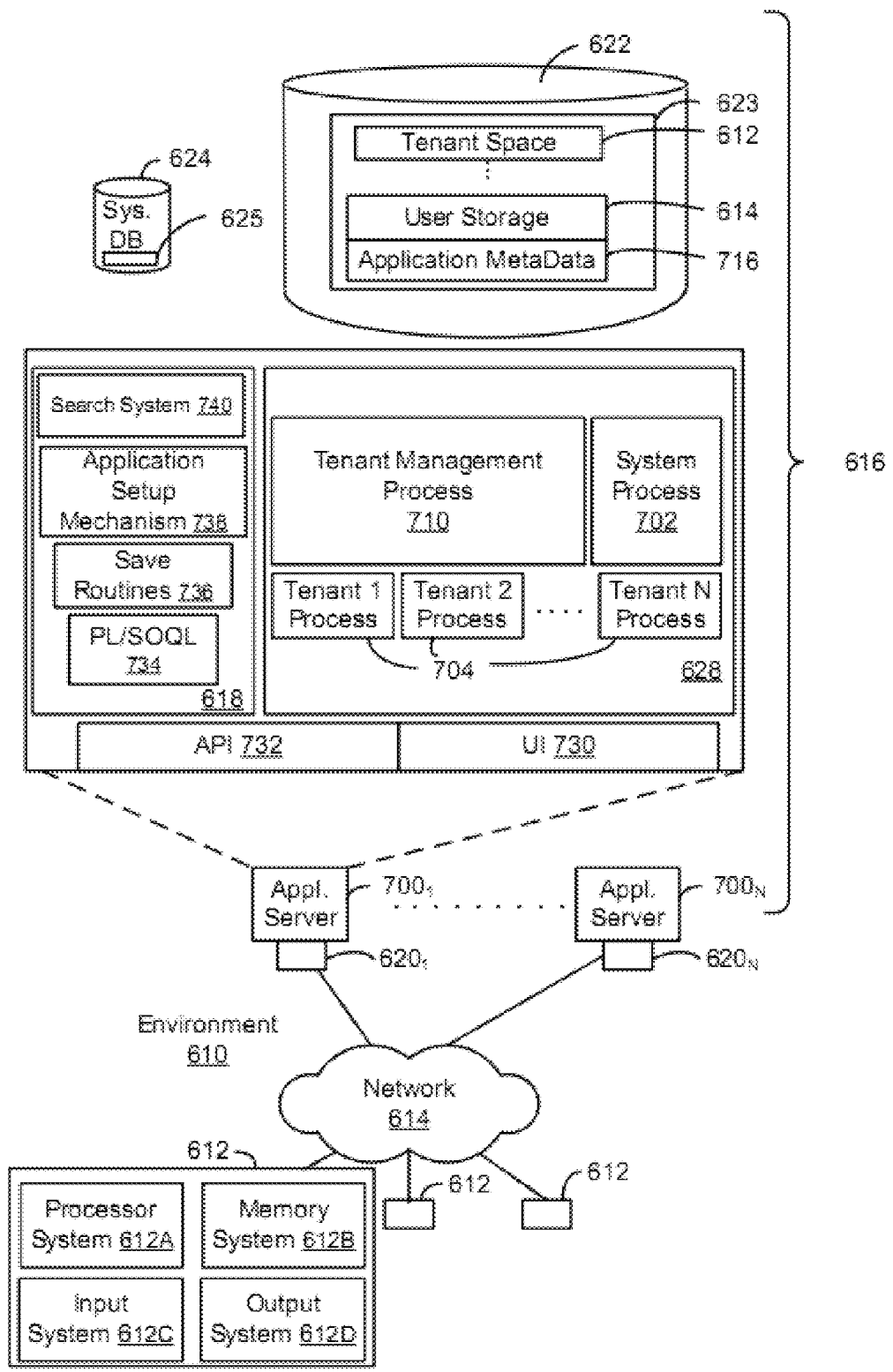
FIG. 7 illustrates a block diagram of an embodiment of elements of FIG. 4 and various possible interconnections between these elements.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers $700_1$-$700_N$, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 734 that provides a programming language style interface extension to API 732. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server $700_1$ might be coupled via the network 614 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A computer program product embodied on a non-transitory computer readable medium, comprising computer code causing a computer to implement a method, comprising:
   identifying at a first system a plurality of data elements including:
      a plurality of objects,
      metadata descriptions of one or more of the objects, and
      a plurality of updates to a recipient system that are automatically performed by the recipient system in response to receiving the plurality of data elements, the plurality of updates utilizing one or more of the objects;
   grouping by the first system the plurality of objects, the metadata descriptions, and the plurality of updates within a single implementation item to be implemented at the recipient system;
   transmitting by the first system the single implementation item to the recipient system, utilizing a single application programming interface (API) call;
   performing, at the recipient system, the plurality of updates to the recipient system utilizing one or more of the data objects, in response to the recipient system receiving the single implementation item;
   identifying, at the recipient system, an error during the performing of the plurality of updates;
   rolling back, by the recipient system, all of the plurality of updates to the recipient system within the single implementation item; and
   retransmitting to the recipient system, by the first system, the single implementation item, utilizing the single API call.

2. The computer program product of claim 1, wherein the plurality of data elements include one or more entities.

3. The computer program product of claim 1, wherein the plurality of data elements include a location.

4. The computer program product of claim 1, wherein the plurality of data elements include one or more criteria to be used in a search.

5. The computer program product of claim 1, wherein the plurality of data elements include one or more interrelationships between the plurality of objects.

6. The computer program product of claim 1, wherein the plurality of data elements include one or more of an object insertion instruction, an object update instruction, an object delete instruction, an object match instruction, and an object request instruction.

7. The computer program product of claim 1, wherein the plurality of data elements are associated with an event.

8. The computer program product of claim 1, wherein the plurality of data elements includes data that is replicated between the first system and the recipient system.

9. The computer program product of claim 1, wherein the computer program product is operable such that the plurality of data elements is grouped as a single data structure.

10. The computer program product of claim 1, wherein the computer program product is operable such that the plurality of data elements is bundled within a single object.

11. The computer program product of claim 1, wherein computer program product is operable such that a search is performed for one or more of the plurality of data elements at the recipient system.

12. A method, comprising:
identifying at a first system a plurality of data elements including:
- a plurality of objects,
- metadata descriptions of one or more of the objects, and
- a plurality of updates to a recipient system that are performed by the recipient system in response to receiving the plurality of data elements, the plurality of updates utilizing one or more of the objects;

grouping by the first system the plurality of objects, the metadata descriptions, and the plurality of updates within a single implementation item to be implemented at the recipient system;

transmitting by the first system the single implementation item to the recipient system, utilizing a single application programming interface (API) call; and performing, at the recipient system, the plurality of updates to the recipient system utilizing one or more of the data objects, in response to the recipient system receiving the single implementation item;

identifying, at the recipient system, an error during the performing of the plurality of updates;

rolling back, by the recipient system, all of the plurality of updates to the recipient system within the single implementation item; and retransmitting to the recipient system, by the first system, the single implementation item, utilizing the single API call.

13. An apparatus, comprising:
one or more hardware processors configured to:
identify at a first system a plurality of data elements including:
- a plurality of objects,
- metadata descriptions of one or more of the objects, and
- a plurality of updates to a recipient system that are performed by the recipient system in response to receiving the plurality of data elements, the plurality of updates utilizing one or more of the objects;

group by the first system the plurality of objects, the metadata descriptions, and the plurality of updates within a single implementation item to be implemented at the recipient system;

transmit by the first system the single implementation item to the recipient system, utilizing a single application programming interface (API) call; and perform, at the recipient system, the plurality of updates to the recipient system utilizing one or more of the data objects, in response to the recipient system receiving the single implementation item;

identify, at the recipient system, an error during the performing of the plurality of updates;

roll back, by the recipient system, all of the plurality of updates to the recipient system within the single implementation item; and retransmit to the recipient system, by the first system, the single implementation item, utilizing the single API call.

14. The computer program product of claim 1, wherein the data elements are grouped and the group transmitted such that the data elements are sent as a batch in the single API call via the grouping, thereby avoiding multiple transactional calls for transmitting the data elements.

* * * * *